(No Model.)
W. J. ADAMS.
TURF CUTTER.
No. 461,972. Patented Oct. 27, 1891.
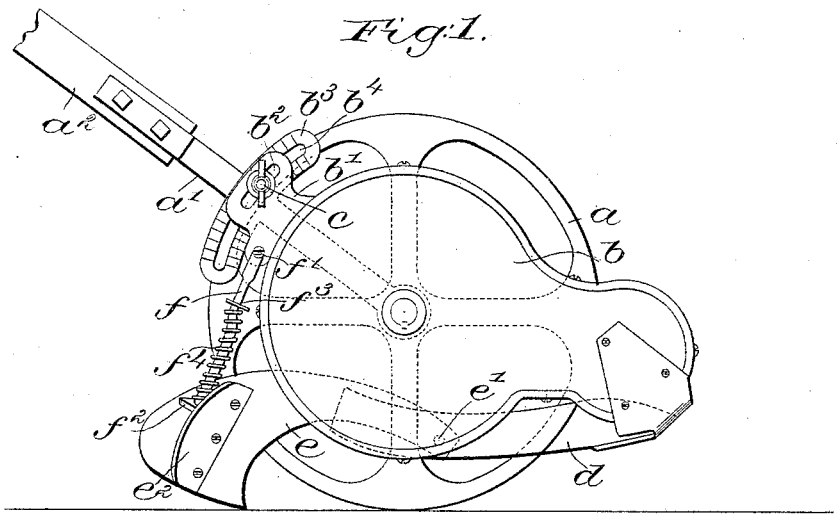
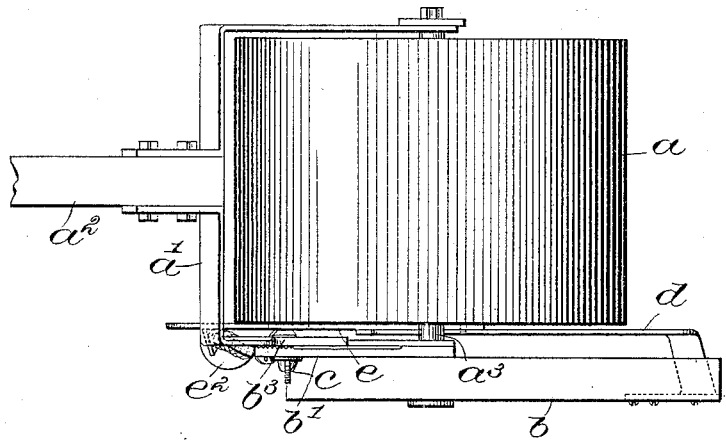
Witnesses.
Fred S. Greenleaf
Edward F. Allen
Inventor:
William J. Adams.
by Crosby & Gregory
attys.

UNITED STATES PATENT OFFICE.

WILLIAM J. ADAMS, OF NEWTON, MASSACHUSETTS.

TURF-CUTTER.

SPECIFICATION forming part of Letters Patent No. 461,972, dated October 27, 1891.

Application filed July 20, 1891. Serial No. 400,084. (No model.)

*To all whom it may concern:*

Be it known that I, WILLIAM J. ADAMS, of Newton, county of Middlesex, State of Massachusetts, have invented an Improvement in Turf-Cutters, of which the following description, in connection with the accompanying drawings, is a specification, like letters on the drawings representing like parts.

This invention relates to turf-cutters for cutting the turf on the borders of lawns and the like, to thereby straighten and trim the edges.

The invention consists in the combination, with a roller preferably made quite heavy, of a knife-supporting frame and a turf-cutting knife or blade connected thereto and lying parallel with the line of travel of the roller. The knife is of peculiar shape and is provided with a turf-guide to direct or turn the severed turf outwardly, and said knife is also spring-controlled and the knife-supporting frame is preferably made adjustable.

Figure 1 shows in side elevation a turf-cutter embodying this invention, and Fig. 2 a plan view of the turf-cutter shown in Fig. 1.

The roller $a$ is journaled in a yoke $a'$, attached to a suitable handle $a^2$. This roller is preferably made of iron and quite heavy to roll down the edge or border as well as to assist by its momentum in carrying the knife forward in a straight line to cut the turf. Mounted on one of the journals, as $a^3$, for instance, preferably at the outside of the arm of the yoke $a'$, is a knife-supporting frame $b$. An ear $b'$ is formed integral with or secured to the frame $b$, having its inner side serrated, as shown in Fig. 2, and provided with a curved slot $b^2$. Formed on or secured to one arm of the yoke $a'$ is a segmental plate $b^3$, the outer side of which is serrated, as shown in Fig. 1, and provided with a curved slot $b^4$, registering with the slot $b^2$ in the ear $b'$. A set-screw $c$ passes through the slots $b^2$ $b^4$, by means of which the supporting-frame is adjusted, as will be readily apparent. A plate $d$ is secured to the supporting-frame $b$, it lying substantially parallel with the line of travel of the roller $a$ and being bent at one end, as shown, to pass around the end of the supporting-frame to be attached thereto at the outside, so that it may be easily detached. A turf-cutting knife or blade $e$ is loosely connected at $e'$ to the plate $d$, said blade being made crescent or hook shaped, as represented in Fig. 1. The knife $e$ is arranged close to the end of the roller $a$ and parallel with the line of travel of said roller. A guide $e^2$ is attached to the knife $e$ just back of the cutting-edge, said guide being made as an outwardly-curved plate and designed to direct outwardly the severed turf. A pin or link $f$ is loosely connected to the ear $b'$ at $f'$, which passes down through a plate $f^2$, fixed to the knife $e$ back of the guide $e^2$, and a collar $f^3$ is secured to said pin or link near its upper end, and a spiral spring $f^4$ surrounds said pin or link $f$, bearing at one end against a fixed plate $f^2$ and at the other end against a collar $f^3$. The function of the spring is to normally keep the knife pressed down, but permits said knife to rise and pass over a stone or other similar obstacle, which would tend to injure the knife. By removing a screw at $f'$ and also by removing the screws by which the plate $d$ is secured to the supporting-frame it will be seen that the turf-cutting blade may be removed, thereby enabling the roller to be used independently. It will be seen that as the roller $a$ is moved forward along the edge of the lawn the knife $e$ will follow along and sever the turf, and as the roller $a$ is made quite heavy the knife may be easily guided in a straight line without having any tendency to swerve.

I do not desire to limit my invention to all the particular details of construction herein shown, as it is obvious that they may be slightly changed and still come within the spirit and scope of this invention.

I claim—

1. In a turf-cutter, the roller $a$ and knife-supporting frame, combined with a spring-controlled pivoted turf-cutting blade, substantially as described.

2. In a turf-cutter, the roller $a$ and knife-supporting frame, combined with a spring-controlled pivoted turf-cutting blade $e$, provided with an outwardly-extended guide $e^2$, substantially as described.

3. In a turf-cutter, the roller $a$ and knife-supporting frame, combined with a plate, as $d$, attached to said frame, and a spring-controlled turf-cutting blade pivoted to said plate $d$, substantially as described.

4. In a turf-cutter, a roller $a$ and adjustable knife-supporting frame, combined with a spring-controlled pivoted turf-cutting blade $e$, substantially as described.

In testimony whereof I have signed my name to this specification in the presence of two subscribing witnesses.

WILLIAM J. ADAMS.

Witnesses:
 BERNICE J. NOYES,
 AUGUSTA E. DEAN.